United States Patent [19]

Uchiyama et al.

[11] Patent Number: 5,208,431
[45] Date of Patent: May 4, 1993

[54] METHOD FOR PRODUCING OBJECT BY LASER SPRAYING AND APPARATUS FOR CONDUCTING THE METHOD

[75] Inventors: Futoshi Uchiyama, Kashiwa; Koichi Tsukamoto; Yoshihiro Ohno, both of Tokyo; Yasuo Kaga; Akihiko Momma, both of Tsukuba, all of Japan

[73] Assignees: Agency of Industrial Science & Technology; Ministry of International Trade & Industry, both of Tokyo, Japan

[21] Appl. No.: 756,875

[22] Filed: Sep. 9, 1991

[30] Foreign Application Priority Data

Sep. 10, 1990 [JP] Japan ................... 2-239655

[51] Int. Cl.⁵ ............................... B23K 26/00
[52] U.S. Cl. .................... 219/121.65; 219/121.66; 219/121.63; 219/121.64; 219/121.82; 219/121.84; 156/272.8
[58] Field of Search ............... 219/121.63, 121.64, 219/121.82, 121.84, 121.65, 121.66, 121.6, 121.85; 156/62.2, 272.8

[56] References Cited

U.S. PATENT DOCUMENTS

| | | | |
|---|---|---|---|
| 4,323,756 | 4/1982 | Brown | 219/121.66 X |
| 4,730,093 | 3/1988 | Mehta et al. | 219/121.63 |
| 4,752,352 | 6/1988 | Feygin | 219/121.68 X |
| 4,927,992 | 5/1990 | Whitlow | 219/121.65 |
| 4,944,817 | 7/1990 | Bourell et al. | 219/121.66 X |
| 4,947,463 | 8/1990 | Matsuda et al. | 219/121.85 |

FOREIGN PATENT DOCUMENTS 63-66900 12/1988 Japan.

Primary Examiner—C. L. Albritton
Attorney, Agent, or Firm—Oblon, Spivak, McClelland, Maier & Neustadt

[57] ABSTRACT

A method for producing an object includes the steps of directing a laser beam to pass near a multiaxis table, supplying material from a material supply device to pass through and be melted by the laser beam, conveying the molten material to a prescribed location on the multiaxis table by allowing it to fall under its own weight or conveying it with a carrier gas, three-dimensionally controlling the position and attitude of the multiaxis table by means of a controller, and progressively depositing the molten material at prescribed locations on the multiaxis table for producing an object of a prescribed shape.

13 Claims, 3 Drawing Sheets

METHOD FOR PRODUCING OBJECT BY LASER SPRAYING AND APPARATUS FOR CONDUCTING THE METHOD

BACKGROUND OF THE INVENTION

1. Field of the Invention

This invention relates to a method for producing an object by laser and an apparatus for conducting the method, and more particularly to a method and apparatus for producing an object without using a mold by melting a metal, ceramic or other such material by passing it through a laser beam and progressively depositing the molten material at a prescribed location so as to assume a prescribed shape. In this specification the term "object" is used to encompass both articles which are finished products and articles for use as components of various kinds of equipment and the like.

2. Prior Art Statement

One of the inventors previously proposed a method for adhering material melted by a laser beam to a substrate by causing a laser beam to pass near the substrate without impinging thereon and supplying the material so as to cut through the laser under acceleration in the direction of the substrate (Japanese Patent Publication SHO No. 63-66900).

This earlier invention enables materials with a wide range of melting points to be instantaneously melted and attached to a substrate. Moreover, since the material is melted in a laser beam and immediately adhered to the substrate, the resulting coating layer is almost totally free of impurities and constitutes a high quality deposited material.

The present invention is an improvement on this earlier laser beam spraying method, whose object is to provide a method and apparatus for producing an integral object of desired shape without use of a mold.

Another object of the invention is to provide such a method and apparatus for seamlessly and integrally producing from a plurality of different materials an object exhibiting excellent abrasion resistance, heat resistance and other superior mechanical properties.

SUMMARY OF THE INVENTION

For achieving these objects, the present invention provides a method for producing an object comprising the steps of directing a laser beam to pass near a multiaxis table, supplying material from a material supply device to pass through and be melted by the laser beam, conveying the molten material to prescribed locations on the multiaxis table by either allowing it to fall under its own weight in a vacuum or conveying it with a carrier gas, three-dimensionally controlling the position and attitude of the multiaxis table by means of a controller, and progressively depositing the molten material at prescribed locations on the multiaxis table for producing an object of a prescribed shape.

Thus, in the present invention the position and attitude of the multiaxis table is controlled so as to progressively deposit the material melted by the laser beam at prescribed locations thereon for forming an integral body. Bodies of complex shapes can be formed by using a computer to control the rate of material supply and the position and attitude of the table. It is also possible to produce integral objects consisting of different materials at different parts by simultaneously or individually irradiating two or more materials. Thus, according to the use to which the object is to be put, it is, for example, possible to fabricate corrosion resistant tubes or vessels having a ceramic inner surface and a metal outer surface, abrasion resistant members having a sliding or bearing surface of ceramic and other portions of metal, and heat resistant members constituted of ceramic at portions to be exposed to high temperatures and of metal at the other portions. As these objects are formed seamlessly without joints or the like, they are high in strength and safety.

The above and other features of the present invention will become apparent from the following description made with reference to the accompanying drawings.

BRIEF DESCRIPTION OF THE DRAWINGS

FIG. 5($b$) is a photograph of a band-like projecting object formed according to the invention.

DESCRIPTION OF THE PREFERRED EMBODIMENT

Figure 1:
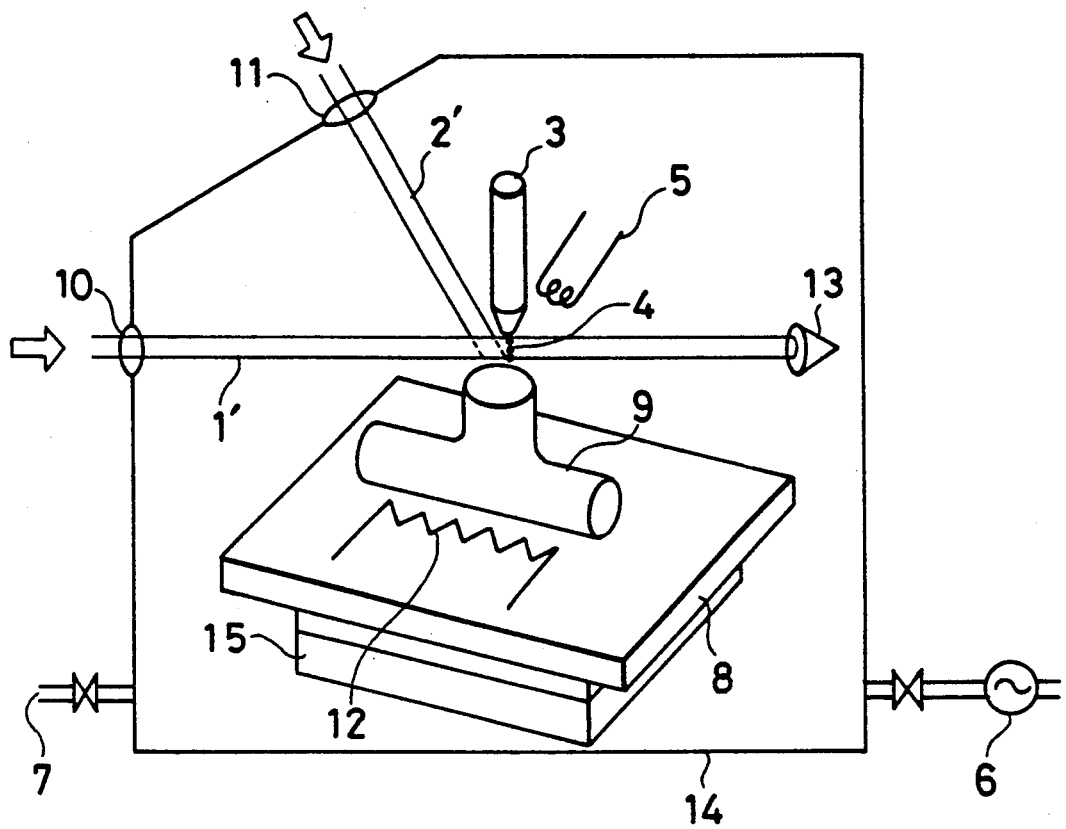
FIG. 1 is a schematic perspective view for explaining the apparatus for producing an object according to the invention.
Figure 2:
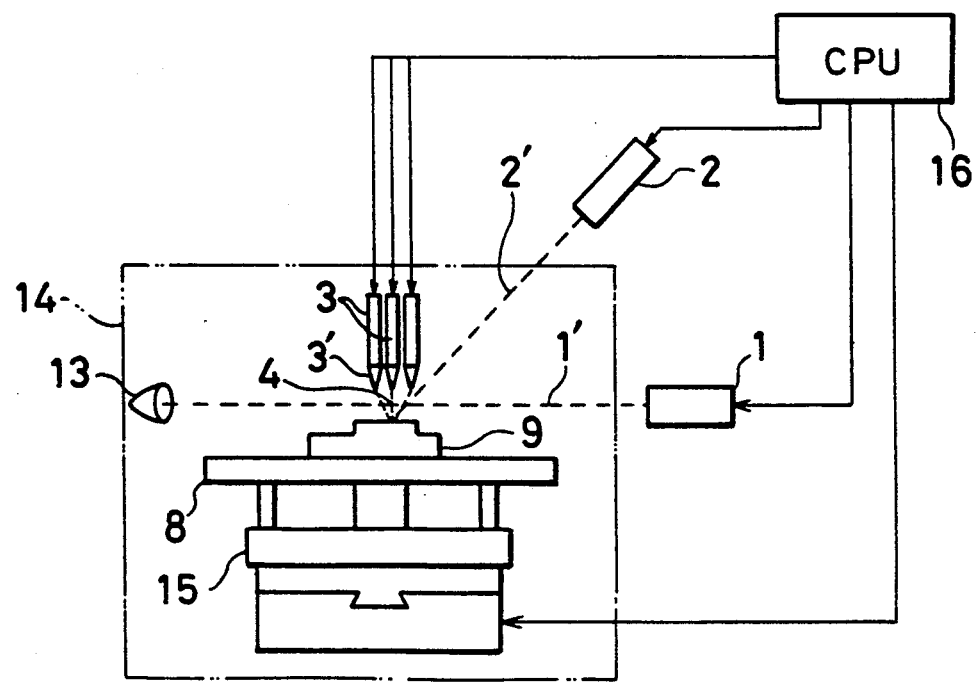
FIG. 2 is a block diagram of the arrangement of the apparatus of FIG. 1.

An embodiment of the apparatus for producing objects according to the present invention is schematically illustrated in FIGS. 1 and 2. A multiaxis table 8 supported by a controller 15 capable of three-dimensional position and attitude control is disposed within a chamber 14 equipped with a vacuum pump 6 and an atmosphere gas supply port 7. A material supply device 3 is positioned above the multiaxis table 8 by device supporting means not shown in the drawings.

A laser beam source 1 is installed outside of the chamber 14 for directing a laser beam 1' to pass through the space between the material supply device 3 and the multiaxis table 8. Inside the chamber 14, at a position on the optical path of the laser on the opposite side of the aforesaid space from the laser beam source 1, is disposed a laser light absorber 13.

The method of using the apparatus constituted in the foregoing manner for producing an object will now be explained. Except for the case where the object to be produced is constituted of one or more oxides, the vacuum pump 6 is operated to evacuate the 14, whereafter, if required, argon, nitrogen or another such inert gas is introduced into the chamber 14 through the gas supply port 7. If the object to be produced is constituted of one or more oxides and the incorporation of impurities therein is a problem, the oxygen partial pressure of the atmosphere inside the chamber 14 is appropriately adjusted or, otherwise, if the incorporation of impurities is not a problem, the gas within the chamber 14 can be atmospheric air.

After the appropriate atmosphere has been established in the chamber 14 in the foregoing manner, the multiaxis table 8 is, if necessary, preheated using its built-in auxiliary heater 12. The laser beam source 1 is then activated to direct the laser beam 1' into the chamber 14 through a window 10.

The laser may be of any type capable of instantaneously melting the material. A conventional CO₂, CO or other such laser with a high-output of, for example, 30 to 50 KW, gives excellent results.

Next, the controller 15 is operated by commands from a CPU (central processing unit) 16 so as to position the multiaxis table 8 so that the portion thereof at which the object is to be formed is brought in front of the supply nozzle 3' of the material supply device 3.

As the multiaxis table 8 capable of multiaxial control there can be used a conventional type equipped with a controller capable of three-dimensionally controlling its position and attitude.

After the multiaxis table 8 has been moved to the prescribed position and placed in the prescribed attitude, the material supply device 3 is actuated to discharge material through the laser beam 1' in the direction of the multiaxis table 8. The material discharged from the nozzle 3' is instantaneously melted when it intersects with the laser beam 1' at the material melting spot 4, whereafter the molten material continues on to, and adheres at, the prescribed location on the multiaxis table 8. A carrier gas is used for carrying the molten material precisely to the prescribed location without scattering. The carrier gas can be of the same kind as the gas constituting the atmosphere in the chamber 14. When a powder material is used, the carrier gas is jetted from the nozzle 3' of the material supply device 3 together with the powder material so as to carry the powder material to the material melting spot 4, where it melts, and then carry the molten material to the prescribed location on the multiaxis table 8. Where the material is in rod or wire form, the carrier gas is blown from jets provided around a nozzle for paying out the material, the rod or wire is extended up to the material melting spot 4, where it is progressively melted, and the carrier gas carries the molten material to the prescribed location.

The means for jetting the carrier gas may be of any type and may, if convenient, be disposed at a position apart from the material supply device 3.

If the multiaxis table 8 is moved at a prescribed speed while the molten material is being carried to the prescribed location thereon, the molten material will progressively adhere to the multiaxis table in a band-like configuration. The width of the band depends on the width of the carrier gas spot on the multiaxis table 8, while the height thereof depends mainly on the material feed rate and the travel speed of the multiaxis table. The diameter of the carrier gas spot can be controlled on the millimeter order by adjusting the nozzle or jets. By laterally reciprocating and simultaneously lowering the multiaxis table, it is possible to form a wall-like projection of desired width and height. In contrast, if the multiaxis table is merely lowered at a prescribed speed, the molten material deposits at a single point so that an elongated object of a diameter corresponding to that of the carrier gas stream is obtained. A cylindrical object can be formed by rotating the multiaxis table 8 about a fixed point.

It will thus be understood that by using the CPU 6 to control the position and attitude of the multiaxis table 8, the material feed rate, the material feed timing, the carrier gas flow rate and the carrier gas spot area, it becomes possible to form complexly shaped objects, directly without the use of molds. Where the object to be formed requires the supply of precise amounts of powder material, it is advantageous to measure the amount of the material to be supplied using the apparatus for continuously supplying minute amounts of material disclosed in the inventors' U.S. Pat. No. 4,836,417.

Among the various materials that can be supplied from the supply device 3 for use in this invention there can be mentioned such metals as stainless steel, copper and aluminum and various ceramics including those of the silica, alumina, zirconia and titanium types. It is also possible to use all types of materials conventionally used in the plasma spraying method, including borides, oxides, nitrides and the like. Use of polymer materials is also possible if a low power laser is used.

Powder materials are particularly preferable since they melt easily, but rod and wire materials that can be instantaneously melted by a laser beam can also be employed.

Figure 3:
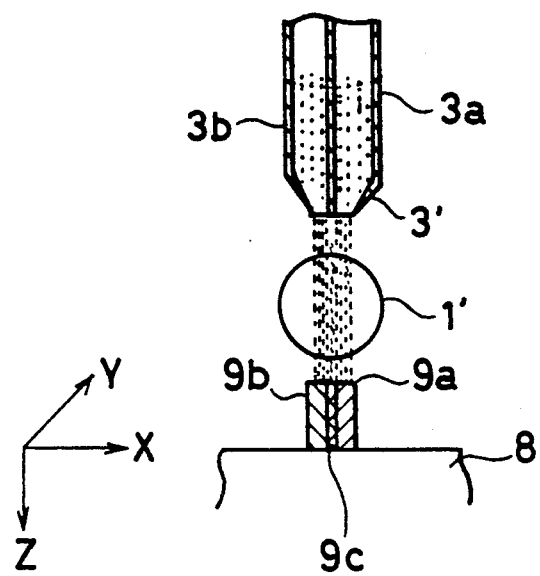
FIG. 3 is a schematic view showing an example of how an object is produced according to the invention.

As shown in FIG. 2, a plurality of material supply devices 3 can be used for progressively supplying different kinds of materials to one and the same location When this arrangement is used, it becomes possible to produce objects constituted of layers of different metals or of a combination of metal and ceramic layers Further, as shown in FIG. 3, two material supply devices 3a and 3b can be disposed side by side for simultaneously supplying two different materials. In this case, the object formed on the multiaxis table 8 consists of a layer 9a formed of one material, a layer 9b formed of the other material, and a layer 9c sandwiched between the layers 9a and 9b and consisting of a mixture of the two kinds of materials.

When two kinds of material are supplied from the material supply devices 3a, 3b in the foregoing manner and the multiaxis table 8 is at the same time rotated about a fixed point, an integral pipe formed of different inner and outer materials is obtained.

Figure 4:
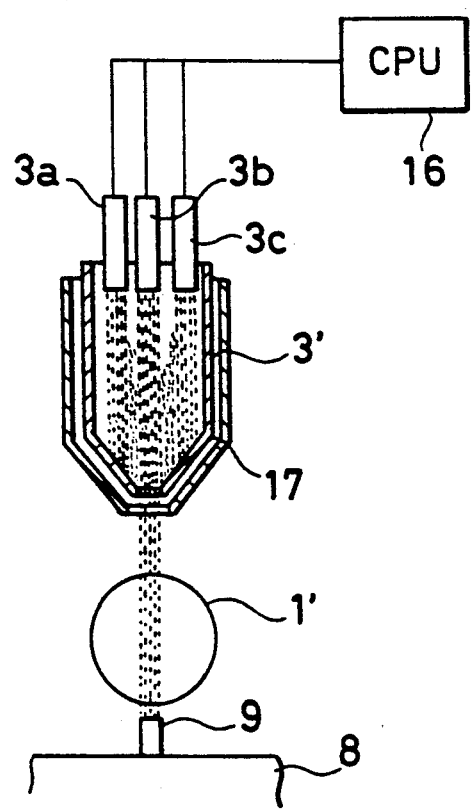
FIG. 4 is a sectional view of a material supply device used in the invention.

Moreover, as shown in FIG. 4, three material supply devices 3a, 3b and 3c can be arranged for simultaneously supplying different materials to a single nozzle 3' so as to form an object 9 consisting of three different materials. Reference numeral 17 in this figure designates a carrier gas supply path.

It is also possible to use the arrangement shown in FIG. 4 for forming an object consisting of a plurality of integrally joined materials of different types. This can be done, for example, by first supplying a first material to the nozzle 3' from the material supply device 3a for depositing the first material on the multiaxis table 8, next also supplying a second material to the nozzle 3' from the material supply device 3b for depositing a mixture of the first and second materials adjacent to the first deposited material, stopping the supply of the first material from the material supply device 3a, continuing to supply the second material to the nozzle 3' for depositing the second material adjacent to the mixture of the first and second materials, and then, after forming an object of prescribed configuration in this manner, depositing a mixture of the second and third materials adjacent to the object by supplying a third material to the nozzle 3' from the material supply device 3c, stopping the supply of the second material from the material supply device 3b, and, finally only depositing the third material adjacent to the mixture of the second and third materials. The depositing of the materials can be conducted either as juxtaposed laterally as in the foregoing explanation or as overlaid one on the next in the vertical direction.

The laser beam 1' is preferably directed to pass as close to the object being formed by the depositing of the material as is possible without impinging thereon since this enhances the adherence of the molten material and holds the intrusion of impurities to a minimum. For ensuring formation of a uniform object, therefore, it is preferable to move the multiaxis table in proportion to the height of the molten material deposited so as to maintain the distance between the laser beam and the deposited molten material constant.

An object was formed using zirconia powder material and a laser beam emitted by a 7 KW laser and condensed by use of a lens to a diameter of 2 mm. The feed rate of the zirconia powder to the material supply device was set at 3 mg/min, the flow rate of the carrier gas at 10 m/sec, and the gas spot diameter at about 1 mm. As a result, a projecting zirconia object measuring about 1 mm in diameter and about 2.0 mm in height was formed in 3 seconds.

Reference numeral 2 in FIGS. 1 and 2 designates an auxiliary laser for producing a laser beam 2' which is directed onto the object 9 formed or being formed on the multiaxis table 8 for such purposes as locally heating the part thereof at which molten material is being deposited so as to enhance the adhesion of the deposited material, heating the surface of the object for smoothing it, or annealing the object.

As explained in the foregoing, in the method of producing objects according to this invention the material is deposited at a prescribed location while varying the position and attitude of the multiaxis table. It thus provides a simple way for producing integral products and parts. Moreover, it enables the state of the deposited material to be varied by varying the level of the laser output, the type, form and supply rate of the material, the distance between the laser beam and the point of deposition, and other such factors. Thus, by appropriately selecting these parameters it is possible to produce anything from porous objects to dense objects exhibiting high strength. In addition, by using the plasma generator 5 shown in FIG. 1 to activate the chamber atmosphere it is possible to form objects constituted of reaction products. For example, when an activated nitrogen atmosphere is used, it becomes possible to form nitride objects exhibiting high resistance to abrasion and heat.

When subjected to harsh use conditions, various pieces of equipment used in laboratories, industrial plants and elsewhere tend to corrode at the interfaces and joints between their different constituent materials and components. They also tend to crack at these same places owing to uneven thermal expansion. The present invention makes it possible to produce equipment and components which are not susceptible to such problems. Specifically, it enables production of such integral articles as, for example, corrosion resistant tubes or vessels having a ceramic inner surface and a metal outer surface, abrasion resistant members constituted of ceramic material only at the portions subject to sliding or other modes of contact with other objects, and heat resistant members having one surface of ceramic and the remaining surfaces of metal. The invention can thus be expected to find application in a wide range of industrial fields.

Figure 5A:
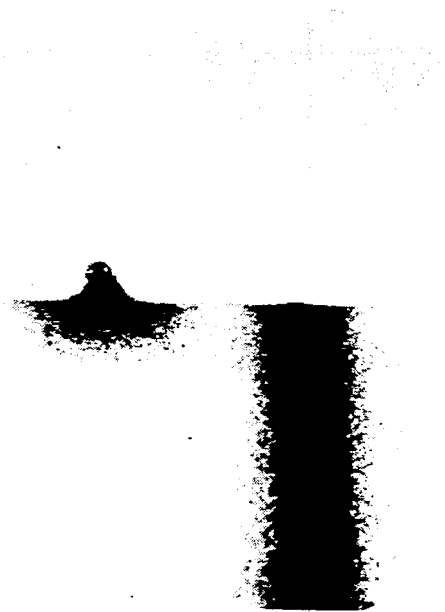
FIG. 5($a$) is a photograph of a projecting object formed according to the method.

One embodiment of this invention will be described hereinafter. In atmospheric air, an alumina pipe measuring 21 mm in diameter was fastened on the multiaxis table and preheated, whereafter a laser beam emitted by a 4 KW laser and condensed by a lens to a diameter of 2 mm was directed to pass 2 mm above the surface of the alumina pipe. Lanthanum cobaltite powder (grain diameter of about 60 μm) was supplied from the material supply device situated above the alumina pipe at the rate of 3 mg/sec to be entrained by an 20 m/sec air stream and carried through the laser beam to the alumina pipe. The lanthanum cobaltite powder was instantaneously melted upon passing through the laser beam. After supply of the powder had been continued for about 3 seconds, a projecting column of lanthanum cobaltite measuring about 1.5 mm in height and about 1.0 mm in diameter was formed on the alumina pipe. An enlarged view of the projecting column formed is shown in the photo of FIG. 5(a). (The shiny portion at the tip of the projecting column is in a molten state because of exposure to the laser beam.)

Figure 5B:
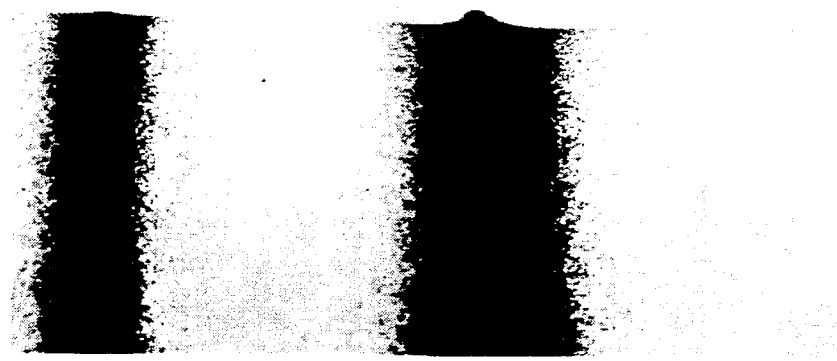

Lanthanum cobaltite powder was supplied to an alumina pipe via a laser beam under the same conditions as set out above. The supply of powder was continued for 3 minutes, during which time the pipe was rotated at the rate of 5 times per minute. As a result a band-like projecting object measuring about 1 mm in height and about 1 mm in width was formed encircling the pipe. An enlarged view of the band-like projecting object is shown in the photo of FIG. 5(b).

What is claimed is:

1. A method for producing an object by laser beam spraying comprising the steps of
    directing a laser beam to pass near an object-forming table capable of being three-dimensionally controlled in position and attitude,
    melting at least one material by passing it through the laser beam and conveying the molten material to a prescribed location on the object-forming table, and
    three-dimensionally controlling the position and attitude of the object-forming table for enabling the molten material conveyed thereto to deposit thereon and form an object of prescribed shape.

2. A method according to claim 1, wherein the at least one material is a plurality of materials.

3. A method according to claim 2, wherein the plurality of materials are a plurality of metals.

4. A method according to claim 2, wherein the plurality of materials are a plurality of ceramics.

5. A method according to claim 2, wherein the plurality of materials are at least one ceramic and at least one metal.

6. A method according to claim 1, wherein the molten material is conveyed to the prescribed location on the table by a carrier gas.

7. An apparatus for producing an object by laser beam spraying comprising
    an object-forming table equipped with means for three-dimensionally controlling its position and attitude,
    laser beam emitting means for emitting a laser beam to pass near the object-forming table,
    material supply means for supplying at least one material into the laser beam, and
    conveying means for conveying material melted by the laser beam to a prescribed location on the object-forming table,
    whereby said object is formed into a prescribed shape by three-dimensionally controlling the position and attitude of the object-forming table for enabling the molten material conveyed thereto to deposit thereon.

8. An apparatus according to claim 7, wherein the material supply means is capable of supplying a plurality of materials.

9. An apparatus for producing an object by laser beam spraying comprising
- a chamber,
- a table disposed inside the chamber and equipped with means for three-dimensionally controlling its position and attitude,
- material supply means provided above the table for supplying at least one material to the table,
- a laser beam source for directing a laser beam through the space between the table and the material supply means for melting the material, and
- conveying means for conveying material melted by the laser beam to a prescribed location on the table.

10. An apparatus according to claim 9, wherein the material supply means is capable of supplying a plurality of materials.

11. An apparatus according to claim 9, further comprising an auxiliary laser beam source for emitting a laser beam for locally heating the object produced.

12. An apparatus according to claim 9, further comprising means for evacuating the chamber and means for supplying inert gas thereto.

13. An apparatus according to claim 9, further comprising a plasma generator disposed in the chamber.

* * * * *